United States Patent [19]

Chang et al.

[11] Patent Number: 5,179,630
[45] Date of Patent: Jan. 12, 1993

[54] LASER PROTECTION WINDOW WITH TILTED MODULATED INDEX OF REFRACTION FILTER ELEMENTS

[75] Inventors: Byung J. Chang, Ann Arbor; James M. Tedesco, Livonia, both of Mich.

[73] Assignee: Kaiser Optical Systems, Inc., Ann Arbor, Mich.

[21] Appl. No.: 254,399

[22] Filed: Oct. 6, 1988

[51] Int. Cl.⁵ ............................ G02B 5/32; G02B 5/28
[52] U.S. Cl. ...................................... 359/15; 359/24; 359/589
[58] Field of Search ................... 350/3.65, 3.7, 162.19, 350/164, 166, 3.77, 3.75; 359/15, 22, 24, 583, 584, 589

[56] References Cited

U.S. PATENT DOCUMENTS

| | | | |
|---|---|---|---|
| 4,601,533 | 7/1986 | Moss | 350/3.77 |
| 4,637,678 | 1/1987 | Moss et al. | 350/3.7 |
| 4,702,548 | 10/1987 | Tanaka et al. | 350/166 |
| 4,747,673 | 5/1988 | Marrs et al. | 350/166 |
| 4,778,263 | 10/1988 | Foltyn | 350/166 |
| 4,830,441 | 5/1989 | Chang | 350/3.77 |

Primary Examiner—Martin Lerner
Attorney, Agent, or Firm—Krass & Young

[57] ABSTRACT

The present invention is a technique for construction of a laser protection window providing broadened angular protection. Plural modulated index of refraction filter elements are constructed to reflect incident light at a predetermined laser threat wavelength over a cone of protection. The plurality of modulated index of refraction filter elements are disposed in tandem at angles to a direction of primary view through the laser protection window which are symmetrical with respect to the direction of primary view. In a first embodiment, a first optional modulated index of refraction filter element is disposed perpendicular to the direction of primary view; the other modulated index of refraction filter elements are disposed in pairs at opposing angles to the direction of primary view. In an alternative embodiment, the angled modulated index of refraction filter element plates are formed of angled segments. The plural modulated index of refraction filter elements may be angled in two planes to provide extended angular coverage both horizontally and vertically.

25 Claims, 9 Drawing Sheets

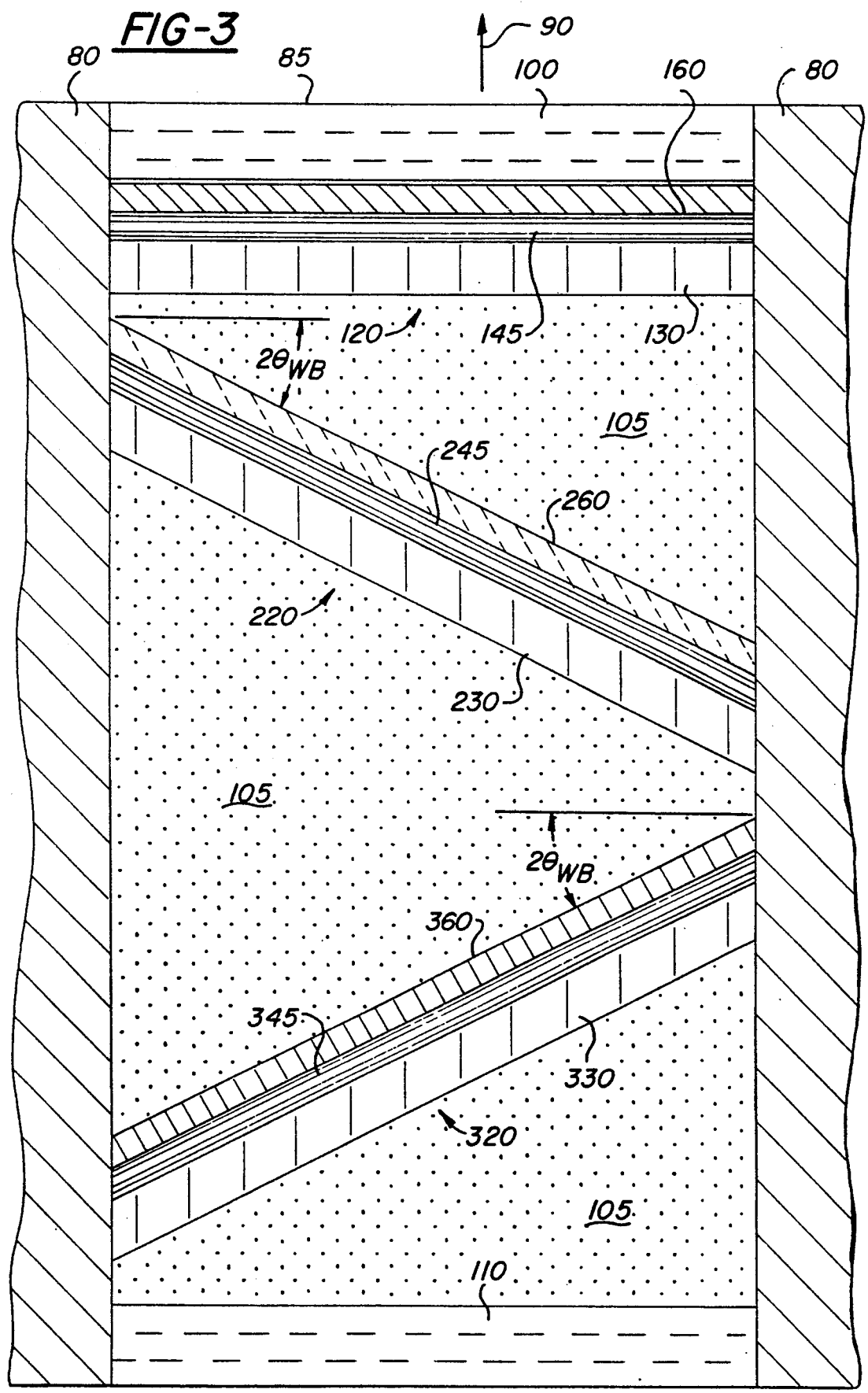

ANGLE OF INCIDENCE IN
LASER PROTECTION WINDOW

LASER PROTECTION WINDOW WITH TILTED MODULATED INDEX OF REFRACTION FILTER ELEMENTS

TECHNICAL FIELD OF THE INVENTION

The technical field of the present invention is that of laser protection and in particular laser production in the form of a window.

BACKGROUND OF THE INVENTION

Due to recent advances in the technology of laser generation and detection, laser systems for use in battlefield conditions have become more and more prevalent. These laser systems are employed for target illumination and tracking or for ranging. Such laser systems may also be employed for intentional blinding of personnel or sensors. In a particular battlefield setting, there may be numerous laser illuminators operating simultaneously. These laser illuminators may be both from friendly forces and from enemy forces. Combat troops operating in this environment will be subject to uncontrolled illumination by laser radiation. Because of the great radiated power from these laser radiation sources, these personnel require some eye protection from this laser illumination.

There have heretofore been suggested numerous solutions for this problem of laser protection. In particular, in recent years there has been an increased interest in the development of modulated index of refraction filter elements as laser protection devices. Modulated index of refraction filter elements include 3-dimensional modulated index of refraction patterns which diffract light at specified wavelengths. Such modulated index of refraction filter elements may be constructed of multilayer dielectric filters or of holographic optical elements. Multilayer dielectric filters are typically constructed from transparent layers of differing indices of refraction vapor deposited on a substrate. Holographic optical elements are ordinarily constructed employing laser illumination to form the interference fringes within the volume of a photosensitive medium. Upon development of the photosensitive medium, the pattern of the interference fringes is fixed within this medium in the form of varying indices of refraction. When light of certain wavelengths enters such a modulated index of refraction filter element, it is diffracted by the modulated index of refraction pattern therein.

In the case of laser production eyewear, it is common to form a modulated index of refraction filter element which reflects incoming radiation at the particular wavelength in a manner making it appear to be a mirror. Because the known laser generators employed in the combat environment includes a relatively limited number of wavelengths, it is possible to form a modulated index of refraction filter element for each of these wavelengths. The laser protective eyewear becomes, in effect, a reflection filter having a relatively narrow filter band about the expected wavelength of the laser source. It is possible to construct a compound structure including modulated index of refraction filter elements constructed to reflect differing wavelengths, in order to provide protection for a number of differing laser sources. Because the width of the spectral notch in such modulated index of refraction filter elements is relatively narrow normal visibility through such laser protective eyewear, even such eyewear having multiple modulated index of refraction filter elements for protection against a number of wavelengths, is relatively unimpaired.

Structures heretofore employed in such laser eye protection devices as goggles or visors do not solve the problems related to the provision of laser protection in a window. In particular, it is known in the art that such modulated index of refraction filter elements do not provide protection for all angles of incident radiation. These reflection modulated index of refraction filter elements provide a protection over only a cone of incident angles. Thus, the eye is not protected from laser illumination received at angles of incidence outside this cone. In the case of goggles or visors, it is possible to provide laser protection for greater angles of incidence employing position of the eye.

In accordance with U.S. Pat. No. 4,637,678, issued to Moss et el. on Jan. 20, 1987 entitled "Holographic Laser Protection Device," a compound holographic optical element structure is taught. A first holographic optical element covers angles of incidence about the normal to the surface of the visor, and a second holographic optical element covers angles of incidence oblique to the surface of the visor. In a second embodiment taught in that patent, the elements in a compound holographic optical element structure offer complementary coverage for angles of incidence from the right and from the left.

In accordance with U.S. Pat. No. 4,830,441 entitled "Holographic Filter Construction for Protective Eyewear," issued May 16, 1989 having the same assignee as the present invention, the geometry of the laser protection eyewear relative to the eye is exploited to provide greater angular coverage. This patent application teaches the use of geometries which are spherically symmetrical about the center of the eye rather than spherically symmetrical about the center of curvature of the protective element as previously taught.

The above teachings relative to goggles and visors cannot be applied to the case of a laser protection window. This is because the eye will not be at a fixed position relative to the laser protection goggles or visors. Therefore, there is a need in the art to provide some manner of laser eye protection through a window such as a vehicle window.

SUMMARY OF THE INVENTION

The present invention is a construction for a laser protection window. This construction involves the use of multiple modulated index of refraction filter elements in tandem. This use of multiple modulated index of refraction filter elements enables blocking of incoming light at a particular predetermined wavelength for greater angles of incidence than with the use of a single modulated index of refraction filter element. This technique does not rely upon the expected position of the eye of the use of the window, and therefore is applicable for windows of relatively large expanse. In addition, the interference fringes within the modulated index of refraction elements embodied as reflection holographic optical elements in accordance with the teachings of the present invention are substantially parallel to the surface of the holographic optical elements, thereby reducing the incidence of flare.

The technique of the present invention involves the use of plural substantially identical modulated index of refraction filter elements. In the preferred embodiment, each modulated index of refraction filter element is embodied as a reflection holographic optical element constructed in the same manner. A photosensitive material such as dichromated gelatin is placed on one surface of a transparent supporting substrate forming a photosensitive layer. A reflecting layer is placed on the open surface of the photosensitive layer. The photosensitive layer is exposed through the transparent supporting substrate to a coherent light source having a predetermined degree of coherence.

This forms an interference pattern within the photosensitive layer between light rays directly incident to the photosensitive layer and light incident to the photosensitive layer by reflection from the reflecting surface at the far side of the photosensitive layer. The interference pattern is captured within the photosensitive layer. After completion of the exposure, the reflecting surface is removed and the photosensitive layer is developed. This causes the photosensitive layer to become a reflection holographic optical element having interference fringes therein corresponding to the interference fringes of the exposure embodied as varying indices of refraction. The particular geometry and the wavelength of the coherent light source are selected in accordance with the prior art to substantially reflect light at a predetermined wavelength corresponding to the expected wavelength of a particular threat laser.

Because the reflecting surface is conformal to one surface of the photosensitive layer during exposure, the interference fringes formed during exposure are substantially parallel to the surfaces of the photosensitive layer. This reduces the incidence of intersection between interference fringes and the surface of the developed holographic optical element, thereby reducing the incidence of flare.

As explained above, it is known in the art that such a structure provides protection against the laser threat wavelength for only a cone of angle about a central line. Typically the element is constructed so that this center line is perpendicular to the surface of the reflection holographic optical element. A compound structure including a plurality of identical reflection holographic optical elements is employed to provide extended angular coverage. These holographic optical elements are disposed at differing angles to the directions of primary view through the laser protection window so that a single ray would have a differing angle of incidence to each of the plurality of reflection holographic optical elements. This differing angle of incidence insures that the cone of protection of the respective holographic optical filter elements provide extended angular coverage against the threat wavelength. This technique is advantageous over the prior art technique which employs a single modulated index of refraction filter element (embodied as a reflection holographic optical element) with a wide angular bandwidth because the technique of this invention provides greater see through.

In accordance with a first embodiment of the present invention, a set of three reflection holographic optical element plates are disposed in tandem. In accordance with a second embodiment of the present invention a first reflection holographic optical element plate is disposed in tandem with a set of second reflection holographic optical element plate segments and a further set of third reflection holographic optical element plate segments. This latter construction enables the completed structure to have a smaller thickness. In accordance with another embodiment a set of two reflection holographic optical elements plates are disposed in tandem at opposite angles to the direction of primary view through the laser protection window. As in the case of the second embodiment described above, these two reflection holographic optical elements plates may also be constructed as holographic optical element plate segments. In a still further embodiment reflection holographic optical elements plates are disposed at angles to the direction of primary view in both the horizontal and vertical planes. This construction enables broadened angular coverage in both the horizontal and vertical planes.

In accordance with the preferred embodiment the holographic optical elements used in the present invention are constructed using light having a limited coherence length. This limited coherence length is greater than the path length of the beam of light from the reflecting surface to the transparent supporting substrate and less than the path length of the beam of light from the reflecting surface to the surface of the transparent supporting substrate opposite the photosensitive layer and reflected back to the photosensitive layer. This causes the limited coherence length to be less than that the path length difference between light rays received by the photosensitive layer directly and light reflected by the photosensitive layer from the reflecting surface and the surface of the transparent supporting substrate opposite the photosensitive layer, thereby preventing the formation of interference fringes from such reflections. Light of reduced coherence length can be formed by passing the light from a highly coherent source, such as a laser, through a moving diffuser plate thereby forming an extended light source having differing phases at differing locations.

BRIEF DESCRIPTION OF THE DRAWINGS

These and other aspects of the present invention will become clearer from the following description taken in conjunction with the figures in which:

FIG. 3 illustrates in cross section the structure of the complete laser protection window in accordance with a first embodiment of the present invention;

DETAILED DESCRIPTION OF THE PREFERRED EMBODIMENTS

Figure 1:
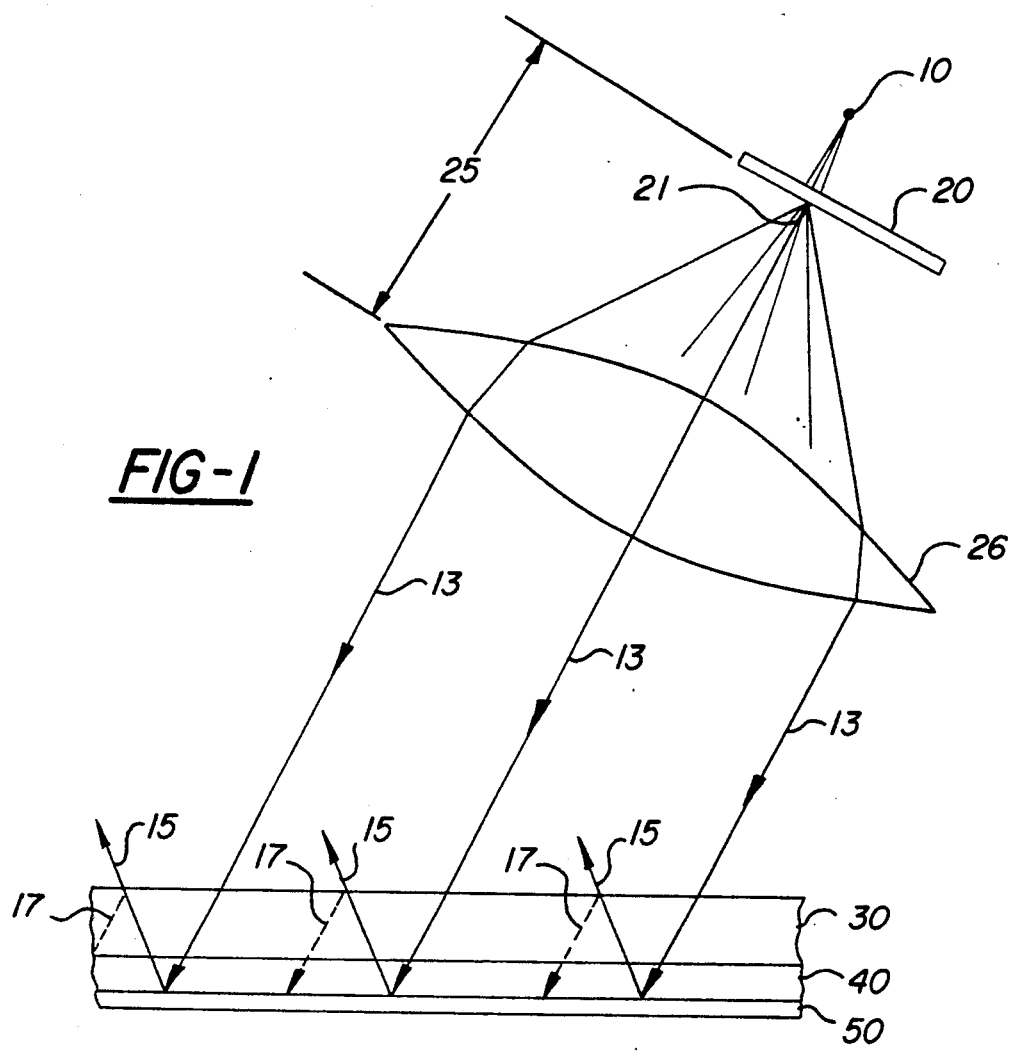
FIG. 1 illustrates schematically the construction of the holographic optical elements in accordance with the preferred embodiment of the present invention.

FIG. 1 illustrates schematically the manner of construction of the holographic optical element employed in the preferred embodiment of the present invention. In accordance with the preferred embodiment of the present invention, the modulated index of refraction filter elements are embodied as holographic optical elements. FIG. 1 illustrates laser point source 10, moving diffuser or random phase plate 20, collimating lens 26, transparent supporting substrate 30, photosensitive layer 40 and reflecting layer 50. Laser point source 10 generates light rays which emerge from moving diffuser or random phase plate 20 and collimating lens 26 as light rays 13. These light rays 13 are reflected from reflecting layer 50 as reflected rays 15 and further reflected from the interior surface of transparent supporting substrate 30 as further reflected rays 17.

The holographic optical element employed in the present invention is constructed as follows. Firstly, a layer of photosensitive material 40 is placed on one surface of a transparent supporting substrate 30. In accordance with the prior art, the photosensitive material 40 preferably consists of a dichromated gelatin. The transparent supporting substrate 30 must be substantially transparent and have sufficient mechanical strength to support the photosensitive layer 40 during exposure. Transparent supporting surface substrate 30 may be constructed of transparent plastic or glass.

Next, reflecting layer 50 is disposed on the open surface of photosensitive layer 40. In accordance with the preferred embodiment of the present invention, reflecting layer 50 consists of a layer of aluminum or silver which is vapor deposited upon the open surface of photosensitive layer 40. As an alternative to directly placing reflecting layer 50 on the open surface of photosensitive layer 40, it is feasible to provide a fixed reflecting surface coupled to the photosensitive layer 40 via a transparent index matching fluid. This index matching fluid must have an index of refraction near to the index of refraction of the photosensitive layer 40. As a further alternative, no additional reflecting surface 40 is required. A transparent fluid having an index of refraction different from the index of refraction of photosensitive layer 40 is disposed beyond the open surface of photosensitive layer 40. The change in index of refraction at this boundary causes partial internal reflections within photosensitive layer 40. These reflections are of sufficient intensity to permit the formation of the desired interference fringes. This transparent fluid could be the ambient air.

The photosensitive layer 40 is exposed as follows. Light having a relatively high coherence is generated by a laser and focused to form laser point source 10. This light is passed through a moving diffuser or random phase plate 20. Laser point source 10 thus generates light rays which form an extended light source 21 emerging from moving diffuser or random phase plate 20. This extended light source 21 on moving diffuser or random phase plate 20 is located a distance 25 from the collimating lens 26, at the focal point of collimating lens 26 substantially parallel and making the same predetermined angle with transparent supporting substrate 30. The purpose of moving diffuser or random phase plate 20 is to reduce the coherence length of the exposure light. The reason for this reduction in the coherence length and the manner in which it is achieved will be further detailed below.

Light rays 13 emerging from the moving diffuser or random phase plate 20 and collimating lens 26 are employed to expose the photosensitive layer 40. These light rays 13 pass through transparent supporting substrate 30 and photosensitive layer 40 and are reflected from reflecting layer 50, becoming reflected rays 15. The direct rays 13 and the reflected rays 15 interfere in the regions where they overlap. In particular, an interference pattern is formed within photosensitive layer 40 due to the interference of direct rays 13 and reflected rays 15. This pattern of interference causes a change in the character of the photosensitive material forming photosensitive layer 40. Thus, the particular interference pattern is captured within photosensitive layer 40.

There will follow an explanation of the reason for reducing the coherence length of the laser illumination via moving diffuser or random phase plate 20. Note in FIG. 1 the further reflected ray 17. This results from the reflection of reflected rays 15 from the inner surface of transparent supporting substrate 30. This reflection is due to the change in index of refraction from that of transparent supporting substrate 30 and what is typically ambient air beyond. The further reflected rays 17 interfere with direct rays 13 to form unwanted secondary interference patterns within photosensitive layer 40. Such secondary interference fringes can cause unwanted images and unwanted flare during the use of the laser protection window and should be avoided.

The reduction of the coherence length of the exposure light serves to control such secondary interference fringes. In accordance with the preferred embodiment of the present invention, the coherence length of the exposure light is reduced as taught in U.S. patent application Ser. No. 277,466 by Chang now U.S. Pat. No. 5,015,049 issued May 14, 1991 entitled "Method for Forming Holographic Optical Elements Free of Secondary Fringes", filed Nov. 23, 1988, a continuation of U.S. patent application Ser. No. 927,341 and now abandoned filed on Nov. 4, 1986 and now abandoned, a continuation of U.S. patent application Ser. No. 613,901 filed May 24, 1984 and now abandoned. The coherence length of the exposure light is the greatest difference in path length between differing ray paths which still permits the formation of interference fringes. Typically, light generated by laser point source 10 has a coherence length which is many times greater than the thickness of transparent supporting substrate 30 and photosensitive layer 40 illustrated in FIG. 1. This coherence length is reduced by passing the diverging light from laser point source 10 through moving diffuser or random phase plate 20. Moving diffuser or random phase plate 20 preferably includes at least one ground glass surface. This ground glass surface causes the light from laser point source 10 to emerge from a number of point sources thus forming extended light source 21. Due to the moving diffuser or random phase plate 20, extended light source 21 has differing phases at differing areas of its extent. This differing phase relationship causes reduced spatial coherence.

This reduction in coherence length must be to a particular coherence length related to the exposure geometry. First, the coherence length of rays 13 must be greater than the longest distance that a ray would travel from first entry in photosensitive layer 40, passing through photosensitive layer 40, reflection by reflecting layer 50, passing back through photosensitive layer 40 to the boundary between photosensitive layer 40 and transparent supporting substrate 30. If the coherence length of rays 13 employed in the exposure is greater than the maximum such path length, then the optical system illustrated in FIG. 1 forms interference fringes of good contrast throughout the photosensitive layer 40. On the other hand, the reduced coherence length of light rays 13 must be less than the minimum distance a light ray would travel from first entry into photosensitive layer 40, passing through photosensitive layer 40, reflection by reflecting layer 50, passing through both photosensitive layer 40 transparent supporting substrate 30, reflection by the interior surface of transparent supporting substrate 30, and again entering into photosensitive layer 40. If the coherence length of exposure rays 13 is less than the minimum such distance, then no interference fringes are formed within photosensitive layer 40 by interference rays 13. By control of the coherence length of illumination rays 13, the recording of secondary interference fringes from such further reflected rays can be substantially eliminated. The depth of transparent supporting substrate 30 is of little consequence in the formation of the holographic optical element, except in determining the path length of the secondary reflections. Therefore, it is feasible to provide transparent supporting substrate 30 with a thickness many times that of photosensitive layer 40. This provides ample safety margin in control of the coherence length by widely separating the required minimum coherence length for formation of the primary interference fringes and the maximum coherence length which still prohibits the formation of the unwanted secondary interference fringes.

Figure 2A:
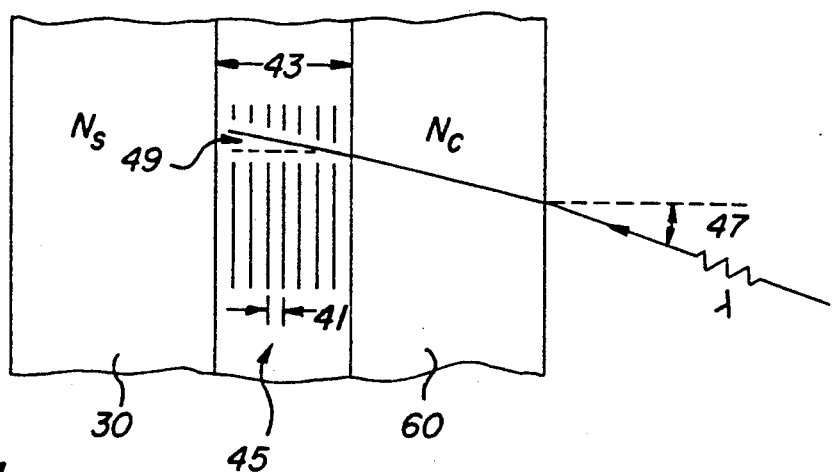
FIGS. 2a to 2d illustrate some fundamental properties of reflection holographic optical elements constructed in accordance with FIG. 1.

After exposure, the photosensitive layer 40 is developed. In accordance with the prior art, the reflecting layer 50 is removed. In the case in which reflecting layer 50 is a vapor deposited silver layer, this removal can be through the use of an acid bath. Then the photosensitive layer 40 is developed in accordance with the prior art in order to fix the interference fringes recorded in this layer during exposure. If the photosensitive layer 40 is dichromated gelatin in accordance with the prior art, then the developed holographic optical element layer 45 is sensitive to ambient humidity. In order to stabilize the structure and prevent deterioration of the interference contrast fringes stored therein, it is typical to dispose a transparent cover plate 60 on the open surface of the developed holographic optical element layer 45 as illustrated in FIG. 2a. This transparent cover plate 60 must be relatively impervious to moisture in order to protect the holographic optical element layer 45. In addition, the transparent supporting substrate 30 must also be similarly impervious to moisture for the same reason.

FIGS. 2a to 2d illustrate some fundamental properties of reflection holographic optical elements constructed in accordance with FIG. 1 when employed as laser protection filters. FIG. 2a shows key parameters which determine the holographic optical element's spectral rejection (or filtering) response. FIG. 2a shows transparent supporting substrate 30, holographic optical element layer 45 and a transparent cover plate 60. FIG. 2a also shows a ray of light with an incident angle 47 ($\theta$). The transparent supporting substrate has an index of refraction of $N_s$, and the transparent cover plate 60 has an index of refraction of $N_c$. Holographic optical element layer 45 has a depth of 43. The index of refraction is modulated within the layer with a fringe spacing 41($d$). Thus the index of refraction of the holographic optical element layer 45 as a function of depth x is:

$$N = N_0 + \Delta N \cos(2\pi x/d) \quad (1)$$

where N is the modulated index of refraction, $N_0$ is nominal index of refraction, and $\Delta N$ is the amplitude of the modulation of the index of refraction. FIG. 2a illustrates that the ray of light has an angle of incidence 49 ($\theta_w$) within holographic optical element layer 45. The angle 49 of incidence within the holographic optical element layer 45 ($\theta_w$) is related to the angle of incidence $\theta$ in air by the following formula:

$$\theta_w = \sin^{-1}(\sin\theta/N_0) \quad (2)$$

Note that this angle $\theta_w$ is not dependent upon the index of refraction $N_c$ of transparent cover plate 60. Also note that equation (2) assumes that the medium beyond transparent cover plate 60 is air, which has an index of refraction near one.

The performance of holographic optical elements is generally expressed in terms of the optical density OD. The optical density of such a holographic optical element is generally a function of wavelength and angle of incidence $\theta_w$. The optical density OD is related to the transmission T by the following equation:

$$OD = -\log(T) \quad (3)$$

Figure 2B:
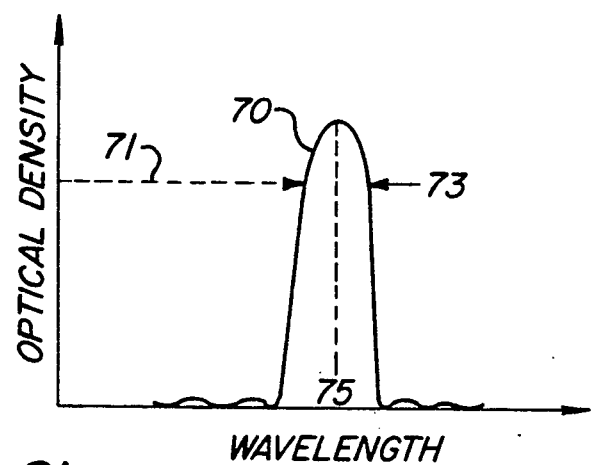

FIG. 2b illustrates a typical optical density curve 70 as a function of wavelength for a fixed angle of incidence. Laser protection devices are typically required to provide some minimum optical density over specified angles of incidence for a particular wavelength. The required minimum optical density for the design illustrated in FIG. 2b is level 71. The key parameters of optical density curve 70 illustrated in FIG. 2b are: the center wavelength of the spectral rejection notch 75; and the spectral bandwidth 73 over which optical density curve 70 maintains the required minimum optical density 71.

The required angular bandwidth over which the threat wavelength $\lambda_t$ is to be maintained determines the spectral bandwidth of the rejection notch of the holographic optical element. Like any multilayer dielectric filter, a holographic optical element exhibits a shift in the spectral notch toward lower wavelengths as the angle of incidence is increased. The spectral notch shift can be approximated as follows:

$$\lambda_c(0) = 2 N_0 d \quad (4)$$

$$\lambda_c(\theta) = \lambda_c(0) \frac{\sqrt{N_0^2 - \sin^2\theta}}{N_0} \quad (5)$$

where $\lambda_c(0)$ is the notch filter center frequency for normal angle (0) of incidence, $\lambda_c(\theta)$ is the notch filter center frequency for an angle of incidence of $\theta$, $N_0$ is the nominal index of refraction of the holographic optical element layer 45 and d is the fringe spacing 41.

Figure 2C:
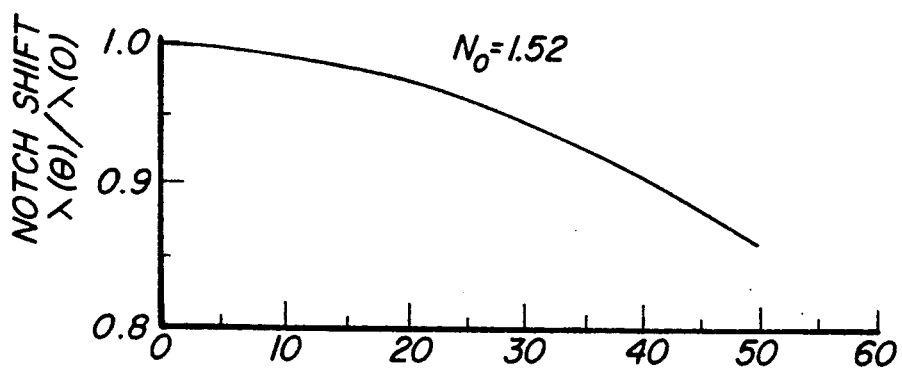

FIG. 2c illustrates the notch filter shift for various angles for the case in which $N_0$ is 1.52. The notch filter shift is expressed as the ratio of $\lambda_c(\theta)$ to $\lambda_c(0)$. The spectral bandwidth requirement of a holographic optical element laser protection filter can be derived (to the first order) from the angular protection requirement and the curve illustrated in FIG. 2c.

Figure 2D:
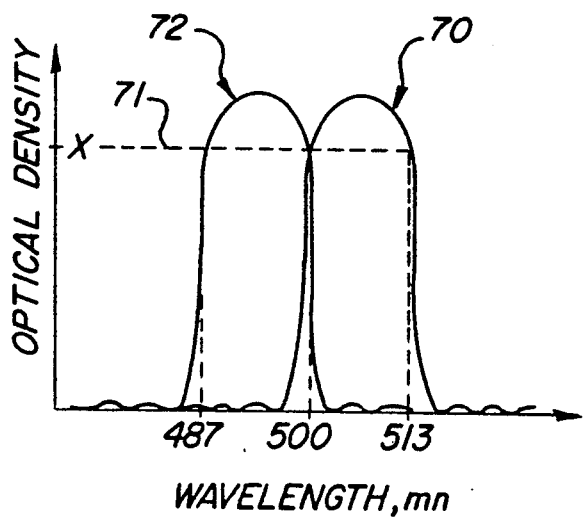

FIG. 2d shows an example of this process for the case of a filter design to block a hypothetical threat wavelength of 500 nm over an angle of incidence of ±20 degrees. Optical density curve 70 is for the case of normal incidence and optical density curve 72 is for the case of an angle of incidence of ±20 degrees. In order to reject the threat wavelength at normal incidence, the lower edge of the spectral notch must cover 500 nm. On the other hand, in order to reject the threat bandwidth at a ±20 degree angle of incidence the upper edge of the spectral notch (as shifted due an angle of incidence of ±20 degrees) must cover 500 nm. From the curve of FIG. 2c or equation (5) the ratio of $\lambda_c(20)$ to $\lambda_c(0)$ is 0.974. This implies a spectral bandwidth of 13 nm at the required optical density. Thus the holographic optical element must reject wavelengths between 500 nm and 513 nm for normal incidence. As illustrated in FIG. 2d, when the wavelength is shifted down for an angle of incidence of 20 degrees, the top of the spectral bandwidth just covers the threat wavelength of 500 nm.

The above approximation for determination of the spectral bandwidth needed in a single holographic optical element filter to cover a given angle is not accurate at high angles of incidence. For large angles of incidence the p-polarized component of the incident light is not rejected. As noted above, large angular coverage from a single holographic optical element filter implies a large spectral bandwidth of the rejection notch. This reduces the see through transmission. Thus a single holographic optical element filter can not provide effective filtering for large angular bandwidths.

The foregoing description of construction of holographic optical elements is in accordance with the preferred embodiment of the present invention. As noted above, it is feasible to construct modulated index of refraction filter elements from deposited layers of differing indices of refraction. These are often referred to as multilayer dielectric filters. The construction of such multilayer dielectric filters is known in the art. This construction typically is achieved by vapor deposition on a transparent substrate of alternating layers of transparent material having differing indices of refraction. Vapor deposition is generally employed to provide the layer thickness desired, which in accordance with equation (4) must be on the same order as the threat wavelength. In such a structure the index of refraction as a function of depth is a square wave rather than the sine wave of equation (1). However, other aspects of the above discussion apply equally well to this construction as to the holographic optical elements previously described.

FIG. 3 illustrates in cross section the construction of the laser protection window consisting of three substantially identical holographic optical elements in accordance with the present invention. The laser protection window is formed within an opening 85 in a wall 80. FIG. 3 also illustrates the direction of primary view 90. This direction of primary view 90 is directly through the laser protection window and generally perpendicular to the wall 80. In accordance with the preferred embodiment of the present invention, the laser protection window is embodied in an opening in a vehicle and is employed to enable the occupants of the vehicle to view the outside scene without fear of exposure to laser illumination.

First holographic optical element plate 120 is disposed across window opening 85 generally across opening 85 perpendicular to the direction of primary view 90. The second holographic optical element plate 220 is disposed at an angle to the direction of primary view 90 which is related to the blocking angle $\theta_{wB}$ of each holographic optical element. The blocking angle $\theta_{wB}$ is defined as the maximum angle to the normal for which the holographic optical elements reflect light of the threat wavelength. Note that this blocking angle $\theta_{wB}$ is somewhat smaller than the angle of incidence from outside the laser protection window due to refraction in accordance with equation (2). The second holographic optical element plate 200 is disposed at an angle of approximately 2 $\theta_{wB}$ within the window of each holographic optical element plate. In a similar fashion, the third holographic optical element plate 320 is disposed at an angle to the direction of primary view 90 opposite to the angle of second holographic optical element plate 220. In other words, third holographic optical element plate 320 is disposed at an angle approximately 2 $\theta_{wB}$ in the opposite direction. In accordance with the preferred embodiment, holographic optical element plates 120, 220 and 320 are constructed in the manner previously described, and are substantially identical except for dimensions.

FIG. 3 illustrates first plate 100 disposed at the entry of the laser protection window and a second plate 110 disposed at the exit of the laser protection window. First plate 100 and second plate 100 are preferably constructed of a transparent shatter proof material to provide mechanical strength and shatter protection to the laser protection window. A transparent filler material 105 is disposed in the spaces between holographic optical element plates 120, 220 and 320, first plate 100 and second plate 110. Transparent filler material 105 is employed to provide additional mechanical strength and to provide increased angular coverage. Note that providing transparent filler material 105 having an index of refraction greater than one permits retention within the laser protection window of light rays having a greater angle of incidence than would otherwise be possible.

Figure 4A:
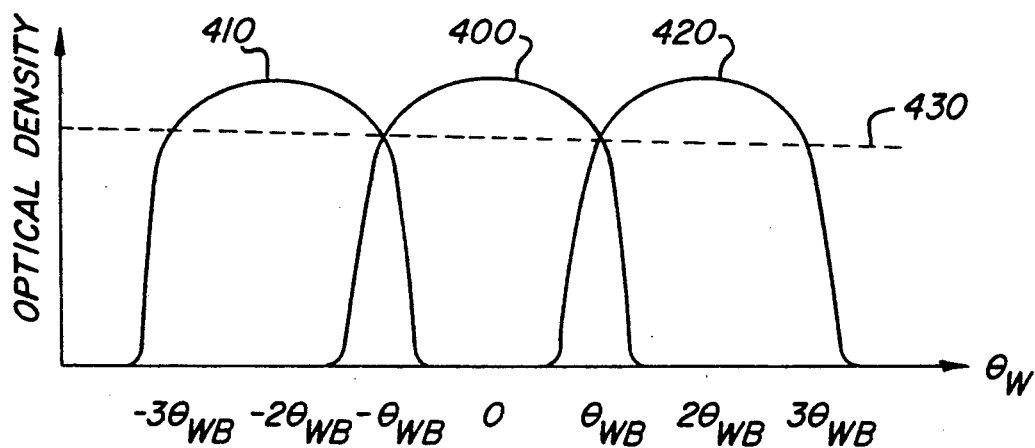
FIGS. 4a to 4e illustrate the optical density of the reflection laser protection window of the present invention constructed in accordance with FIG. 3 under various conditions.

FIG. 4a illustrates the optical density of the laser protection window illustrated in FIG. 3 at the threat wavelength $\lambda_t$ as a function of angle of incidence within the laser protection window. Curve 400 is the optical density of the first holographic optical element 120. Note that this optical density is above the desired optical density level 430 for angles of $\pm \theta_{wB}$. Curve 410 is the optical density of the second holographic optical element 220. Lastly, curve 420 is the optical density of the third holographic optical element 320. Due to its position, second holographic optical element 220 provides an optical density above the desired optical density level 430 for angles of incidence between $\theta_{wB}$ and 3 $\theta_{wB}$. Likewise, third holographic optical element 320 provides the desired optical density 430 for angles of incidence between $-\theta_{wB}$ and $-3 \theta_{wB}$. Thus these three holographic optical elements provide laser protection for an angular bandwidth of three times the angular bandwidth for a single holographic optical element of similar construction.

Note that FIG. 4a illustrates overlap of optical density at the angles $\pm \theta_{wB}$. At $\theta_{wB}$ curves 400 and 420 each provide an optical density above the desired optical density 430. Similarly, both curves 400 and 410 provide an optical density above the desired optical density 430 at the angle $-\theta_{wB}$. This overlap is not strictly required.

It is possible to provide an angle of slightly greater than $2\theta_{wB}$ between the holographic optical elements plates and rely upon some attenuation from each of two plates to provide the desired optical density 430 at the angles of $\pm\theta_{wB}$. In any event, the angle between holographic optical element plates is approximately $\theta_{wB}$.

Figure 4B:
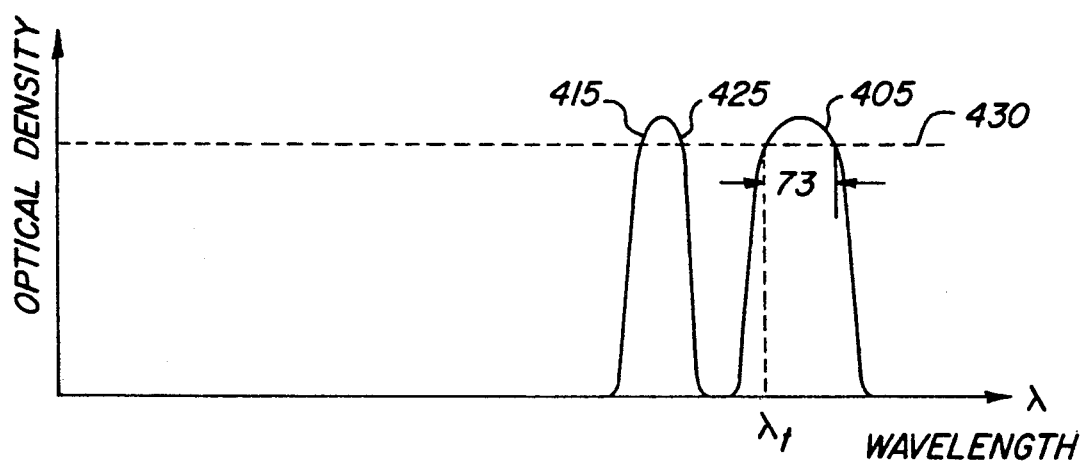
Figure 4C:
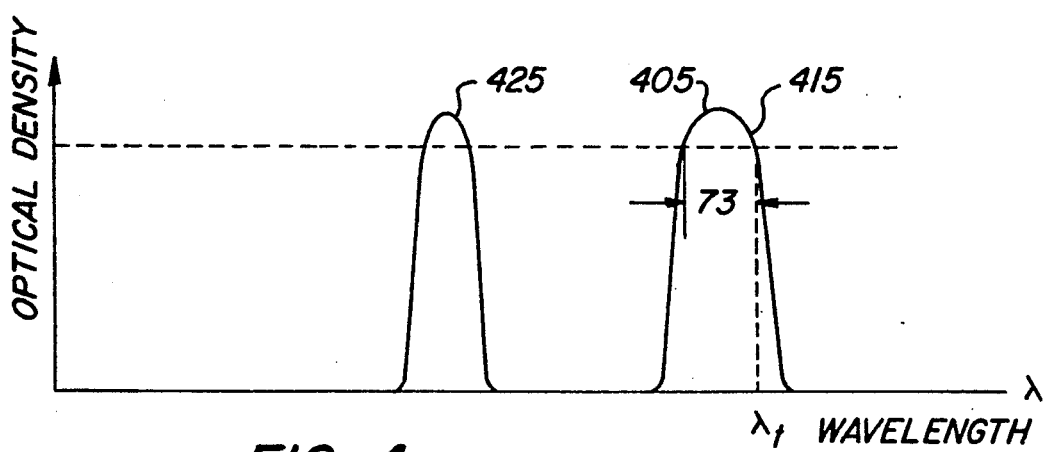
Figure 4D:
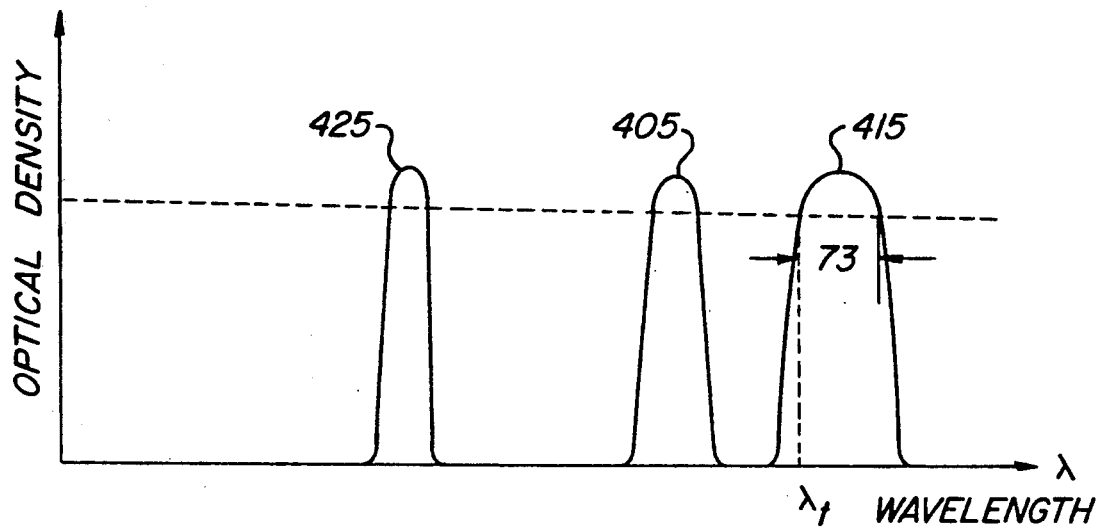

FIGS. 4b to 4e illustrate the optical density of the laser protection window illustrated in FIG. 3 as a function of wavelength for various angles of incidence. FIG. 4b illustrates the case of normal incidence, FIG. 4c the case for an angle of incidence of $\theta_{wB}$; FIG. 4d the case for an angle of incidence of $2\theta_{wB}$; and FIG. 4e the case for an angle of incidence of $3\theta_{wB}$.

FIG. 4b illustrates the optical density of the first holographic optical element 120 at curve 405, the optical density from the second holographic optical element 220 at curve 415, and from the third holographic optical element 320 at curve 425. First holographic optical element 120 has been constructed in accordance with the principles discussed above with a spectral bandwidth 73 providing the desired angular bandwidth $\pm\theta_{wB}$ at the threat wavelength $\lambda_t$. In accordance with the principles discussed above the lower limit of the spectral bandwidth 73 is at the threat wavelength $\lambda_t$ for normal incidence to compensate for wavelength shift at angles of incidence greater than zero. FIG. 4b illustrates curves 415 and 425 as coincident. A light ray along the direction of primary view 90 has an angle of $-2\theta_{wB}$ to holographic optical element 220 and an angle of incidence of $2\theta_{wB}$ to holographic optical element 320. Equation (5) indicates that the shifted center wavelength at the angle of incidence $\theta$, $\lambda_c(\theta)$, is dependent upon the square of sin $\theta$. Thus the wavelength shift is the same for positive and negative angles of incidence.

FIG. 4c illustrates the case of an angle of incidence of $\theta_{wB}$. Such a ray has an angle of incidence of $\theta_{wB}$ to holographic optical element 120, an angle of incidence of $-\theta_{wB}$ to holographic optical element 220 and an angle of incidence of $3\theta_{wB}$ to holographic optical element 320. Curve 425 is further shifted down in wavelength due to increased angle of incidence and is not effective in filtering the threat wavelength $\lambda_t$. Curve 405 is shifted down in wavelength due to increasing angle of incidence while curve 415 is shifted up in wavelength due to increasing angle of incidence. These curves are coincident as illustrated in FIG. 4c for an angle of incidence of $\theta_{wB}$. For this angle the top of the spectral notch 73 of both curves 405 and 415 cover the threat wavelength $\lambda_t$.

FIG. 4d illustrates the case of an angle of incidence of $2\theta_{wB}$. Such a ray has an angle of incidence of $2\theta_{wB}$ to holographic optical element 120, an angle of incidence of 0 degrees to holographic optical element 220 and an angle of incidence of $4\theta_{wB}$ to holographic optical element 320. Curves 425 and 405 are further shifted down in wavelength due to increased angle of incidence and are not effective in filtering the threat wavelength $\lambda_t$. Curve 415 is shifted up in wavelength due to a decreased angle of incidence because this ray is normal to holographic optical element 220. For this angle the bottom of the spectral notch 73 of curve 415 covers the threat wavelength $\lambda_t$.

Figure 4E:
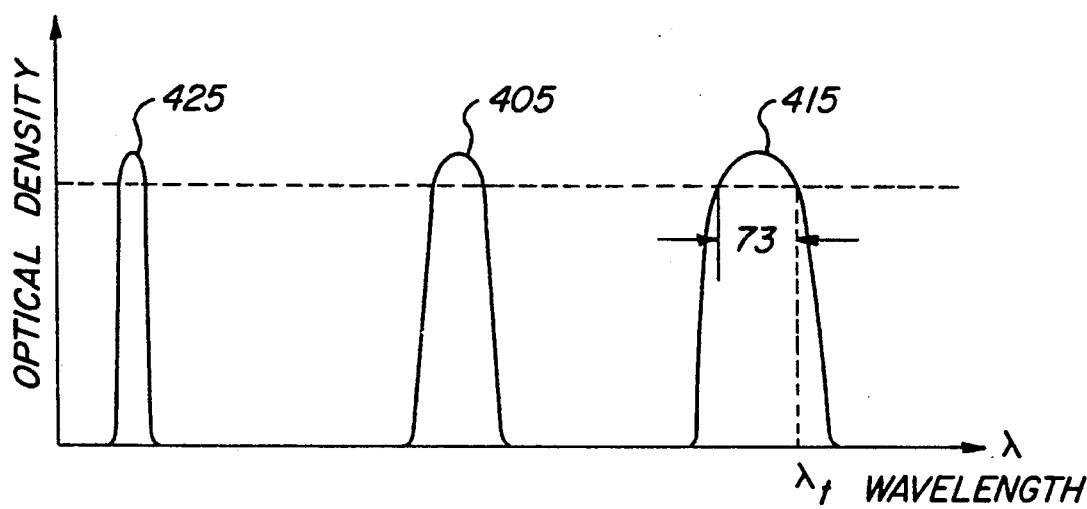

FIG. 4e illustrates the case of an angle of incidence of $3\theta_{wB}$. Such a ray has an angle of incidence of $3\theta_{wB}$ to holographic optical element 120, an angle of incidence of $\theta_{wB}$ to holographic optical element 220 and an angle of incidence of $5\theta_{wB}$ to holographic optical element 320. Curves 425 and 405 are further shifted down in wavelength due to increased angle of incidence and are not effective in filtering the threat wavelength $\lambda_t$. Curve 415 is shifted down in wavelength due to increased angle of incidence. For this angle the top of the spectral notch 73 of curve 415 covers the threat wavelength $\lambda_t$.

It should be understood that for angles from normal incidence to $-3\theta_{wB}$ the roles of curves 415 and 425 would be reversed. The progression from FIG. 4b to FIG. 4e illustrates that one of the curves 405, 415 or 425 includes the threat wavelength $\lambda_t$ within its spectral bandwidth 73 for all angles within $\pm 3\theta_{wB}$ of normal incidence.

The curves illustrated in FIGS. 4a to 4e assume that the three holographic optical elements 120, 220 and 320 are constructed identically. This embodiment is preferable from the standpoint of ease of manufacture but is not required. It may be desirable to provide the normal holographic optical element plate 120 with a different spectral and angular bandwidth than that of the tilted holographic optical element plates 220 and 320. This would require adjustment in the angle between the normal holographic optical element plate 120 and the tilted holographic optical element plates 220 and 320. Regardless of the particular construction of these holographic optical element plates, it is central that the respective angles to the direction of primary view 90 of the holographic optical elements be selected with regard to their angular coverage at the threat wavelength $\lambda_t$ to provide continuous angular coverage.

Figure 5:
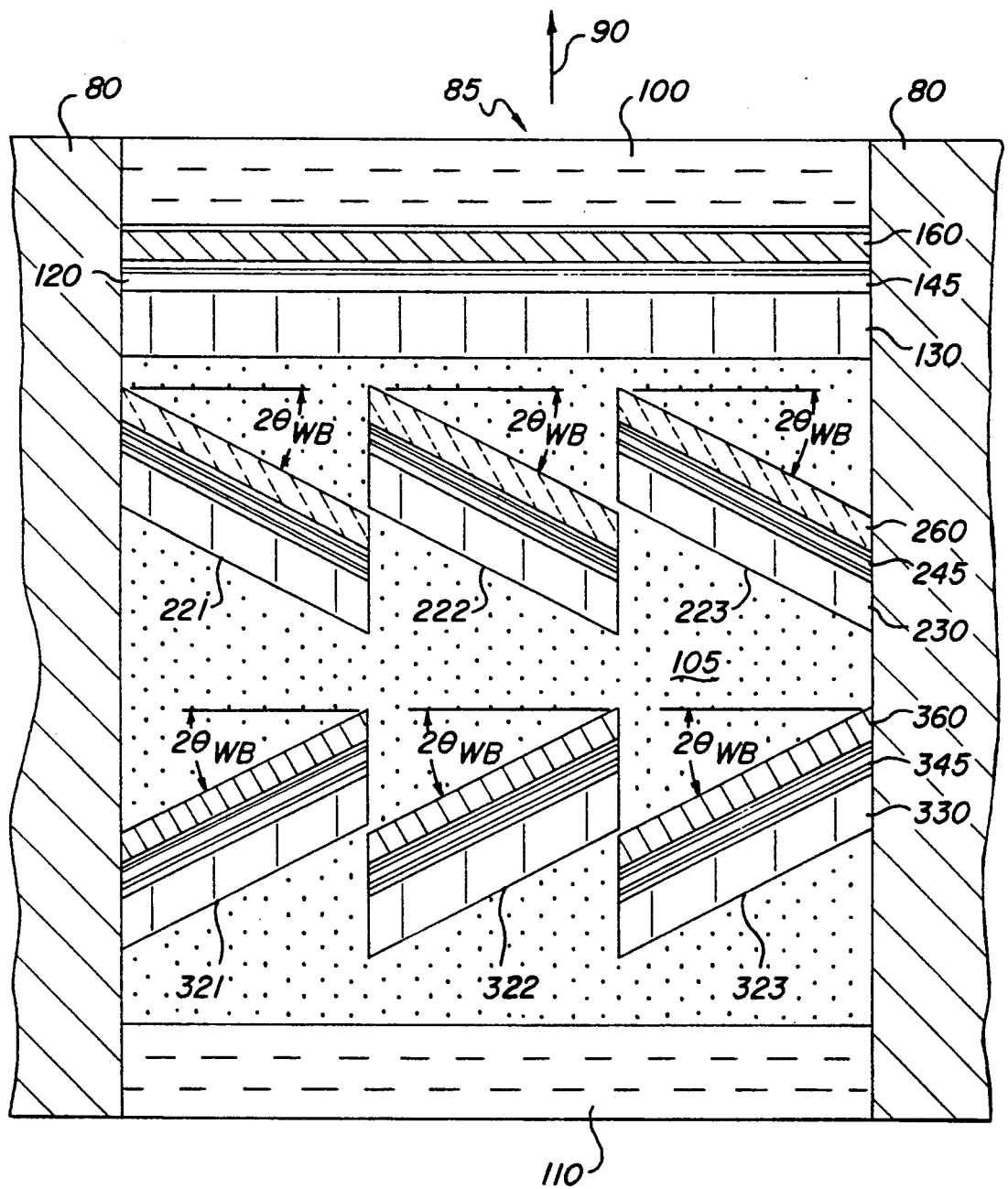
FIG. 5 illustrates in cross section the structure of the completed laser protection window in accordance with a second embodiment of the present invention.

FIG. 5 illustrates an alternative structure for construction of the combined laser protection window in accordance with a second embodiment of the present invention. The laser protection window of this second embodiment is formed within an opening 85 in a wall 80 and includes first plate 100 and second plate 110 as illustrated in FIG. 3. FIG. 5 illustrates first holographic optical element plate 120 which is the same as first holographic optical element plate 120 illustrated in FIG. 3. FIG. 5 illustrates second holographic optical element plate segments 221, 222 and 223 which correspond to the second holographic optical element plate 220 illustrated in FIG. 3. FIG. 5 illustrates third holographic optical element plate segments 321, 322 and 323 which corresponds to the third holographic optical element plate 320 illustrated in FIG. 3. FIG. 5 further illustrates transparent filler 105 which fills the space between first holographic optical element plate 120, second holographic optical element plate segments 221, 222 and 223, and third holographic optical element plate segments 321, 322 and 323.

The alternative structure illustrated in FIG. 5 is constructed as follows. Both the second holographic optical element plate 220 and the third holographic optical element 320 are cut along vertical lines into a set of segments. These segments are then placed in tandem with portions of the first holographic optical element 120, such that the entire area of first holographic optical element plate 120 is covered. Note that each second holographic optical element plate segment 221, 222 and 223 is disposed having an angle slightly less than $2\theta_{wB}$ to the direction of primary view 90. This is the same angle of second holographic optical element plate 220 illustrated in FIG. 3. In a similar fashion, third holographic optical element plate segments 321, 322 and 323 are disposed in tandem with portions of the first holographic optical element plate 120 and have an angle to the direction of primary view 90 which is the opposite of the angle of the corresponding second optical element plate segment. Thus, for each portion of first holographic optical element plate 120 there is a corresponding second holographic optical element plate segment and a corresponding third holographic optical element plate segment. The construction illustrated in FIG. 5 therefore provides the same diffraction efficiency in angle and in wavelength as that illustrated in FIG. 3.

The construction of the present invention either in the manner illustrated in FIG. 3 or in the manner illustrated in FIG. 5 requires that the second holographic optical element plate 220 and the third holographic optical element plate 320 be longer than the first holographic optical element plate 120. The differing length in is proportion to the secant of the angle between the respective plates. Thus, the second holographic optical element plate 220 must have a width which approximates the product of the width of first holographic optical element plate 120 and the secant of the angle between the first holographic optical element 120 and second holographic optical element 220. The third holographic optical element 320 requires a similar length as the second holographic optical element 220. For small angles between the plates the difference is smaller, however, for larger angles the difference becomes much greater.

Figure 6:
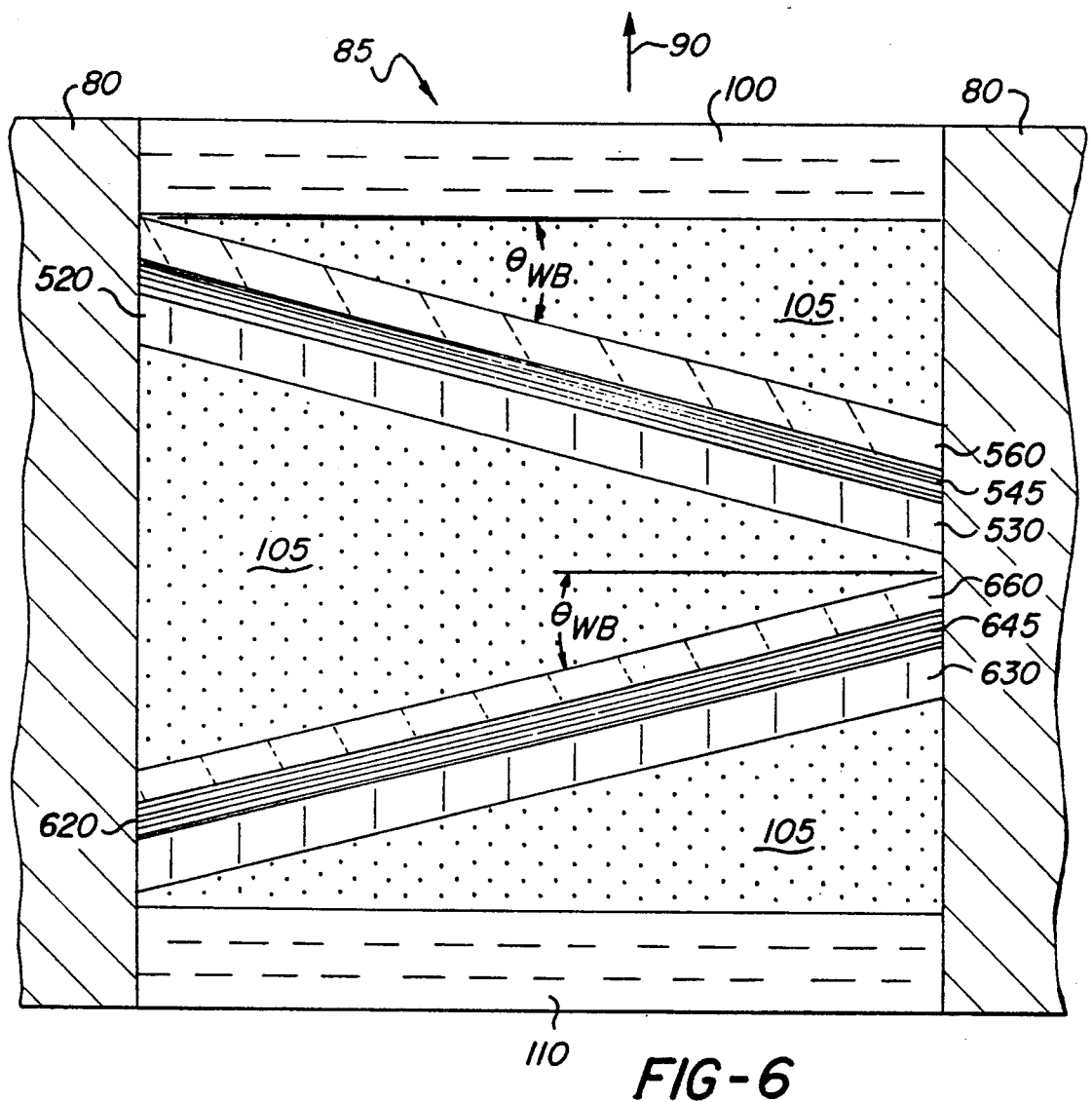
FIG. 6 illustrates in cross section the construction of the laser protection window in accordance with an alternative embodiment of the present invention.

FIG. 6 illustrates in cross section the construction of the laser protection window in accordance with an alternative embodiment of the present invention. The laser protection window of this embodiment is formed within an opening 85 in a wall 80 and includes first plate 100 and second plate 110 as illustrated in FIG. 3. The laser protection window illustrated in FIG. 6 also includes a first holographic optical element plate 520, a second holographic optical element plate 620 and a transparent filler 105. First holographic optical element plate 520 includes transparent supporting substrate 530, the holographic optical element layer 545 and the transparent cover plate 560. Similarly, second holographic optical element plate 620 includes transparent supporting substrate 630, holographic optical element layer 645 and transparent cover plate 660. First holographic optical element plate 520 is disposed across window opening 85 at an angle of slightly less than $\theta_{wB}$ to the direction of primary view 90. The second holographic optical element plate 620 is disposed at an angle to the direction of primary view 90 slightly less than $\theta_{wB}$ in the opposite direction.

Figure 7A:
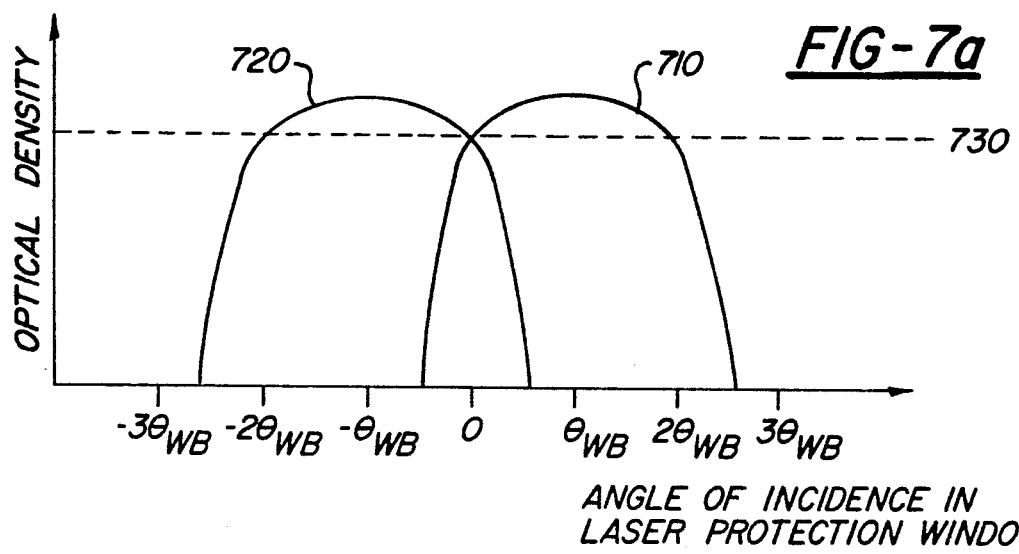
FIGS. 7a to 7d illustrate the optical density of the reflection layer protection window of the present invention constructed in accordance with FIG. 6 under various conditions.

FIG. 7a illustrates the optical density of the laser protection window illustrated in FIG. 6 at the threat wavelength $\lambda_t$ as a function of angle of incidence within the laser protection window. Curve 710 is the optical density of the first holographic optical element 520. Note that this optical density is above the desired optical density level 730 for angles of 0 degrees to 2 $\theta_{wB}$. Curve 720 is the optical density of the second holographic optical element 620. Due to its position, second holographic optical element 720 provides an optical density above the desired optical density level 730 for angles of incidence between 0 degrees and $-2 \theta_{wB}$.

Figure 7B:
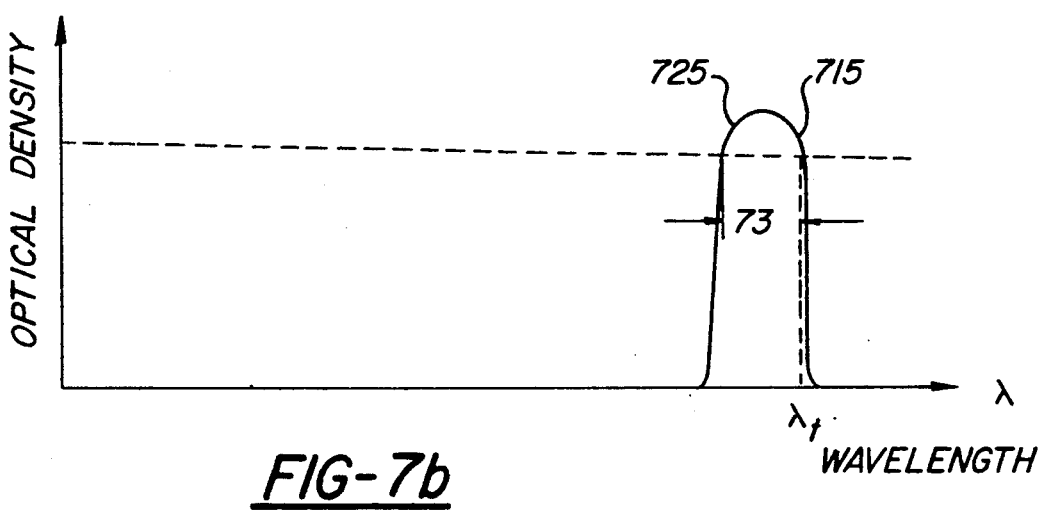
Figure 7C:
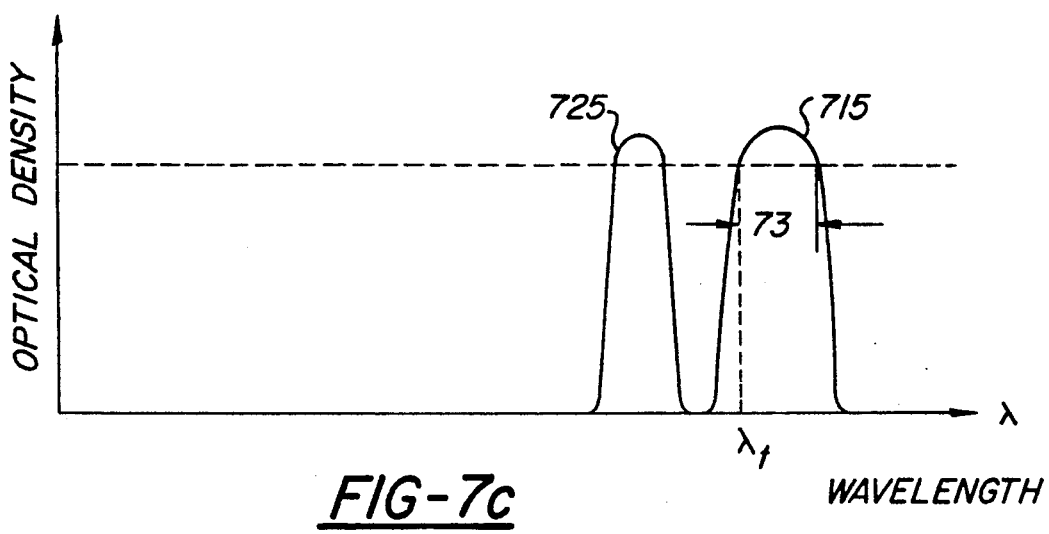
Figure 7D:
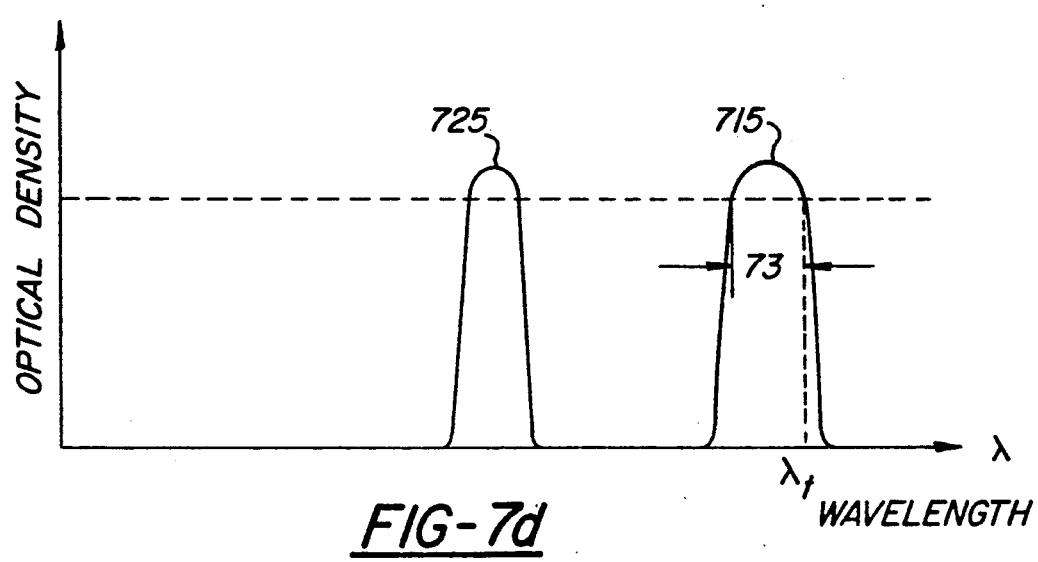

FIGS. 7b to 7d illustrate the optical density of the laser protection window illustrated in FIG. 6 as a function of wavelength for various angles of incidence. FIG. 7b illustrates the case of normal incidence, FIG. 7c the case for an angle of incidence of $\theta_{wB}$; and FIG. 7d the case for an angle of incidence of 2 $\theta_{wB}$.

FIG. 7b illustrates the optical density of the first holographic optical element 520 at curve 715, and the optical density from the second holographic optical element 620 at curve 725. First holographic optical element 520 and second holographic optical element 620 have each been constructed in accordance with the principles discussed above with a spectral bandwidth 73 providing the desired angular bandwidth $\pm \theta_{wB}$ at the threat wavelength $\lambda_t$. FIG. 7b illustrates curves 715 and 725 as coincident. A light ray normal to the laser protection window has an angle of incidence of $-\theta_{wB}$ to holographic optical element 520 and an angle of incidence of $\theta_{wB}$ to holographic optical element 620. This causes an identical wavelength shift for the two holographic optical elements such that curves 715 and 725 are coincident and each filters the threat wavelength $\lambda_t$ at the top of its spectral notch.

FIG. 7c illustrates the case of an angle of incidence of $\theta_{wB}$. Such a ray has a normal incidence to holographic optical element 520, and an angle of incidence of $-2 \theta_{wB}$ to holographic optical element 620. Curve 715 is shifted up in wavelength due to decreasing angle of incidence. For this angle the bottom of the spectral notch 73 of curve 715 covers the threat wavelength $\lambda_t$. Curve 725 is shifted down in wavelength due to increased angle of incidence. Curve 725 does not filter the threat wavelength $\lambda_t$ due to this shift in wavelength.

FIG. 7d illustrates the case of an angle of incidence of 2 $\theta_{wB}$. Such a ray has an angle of incidence of $\theta_{wB}$ to holographic optical element 520 (symmetrical with the case of normal incidence to the laser protection window illustrated in FIG. 7b), and an angle of incidence of 3 $\theta_{wB}$ to holographic optical element 620. Curve 725 is further shifted down in wavelength due to increased angle of incidence and is not effective in filtering the threat wavelength $\lambda_t$. Curve 715 is shifted down in wavelength because the angle of incidence is now increasing rather than decreasing. For this angle the top of the spectral notch 73 of curve 715 covers the threat wavelength $\lambda_t$ in the same manner as the case of normal incidence to the laser protection window as illustrated in FIG. 7b.

It should be understood that for angles from normal incidence to $-2 \theta_{wB}$ the roles of curves 715 and 725 would be reversed. The progression from FIG. 7b to FIG. 7d illustrates that one of the curves 715 or 725 includes the threat wavelength $\lambda_t$ within its spectral bandwidth 73 for all angles within $+2 \theta_{wB}$ of normal incidence.

Figure 8:
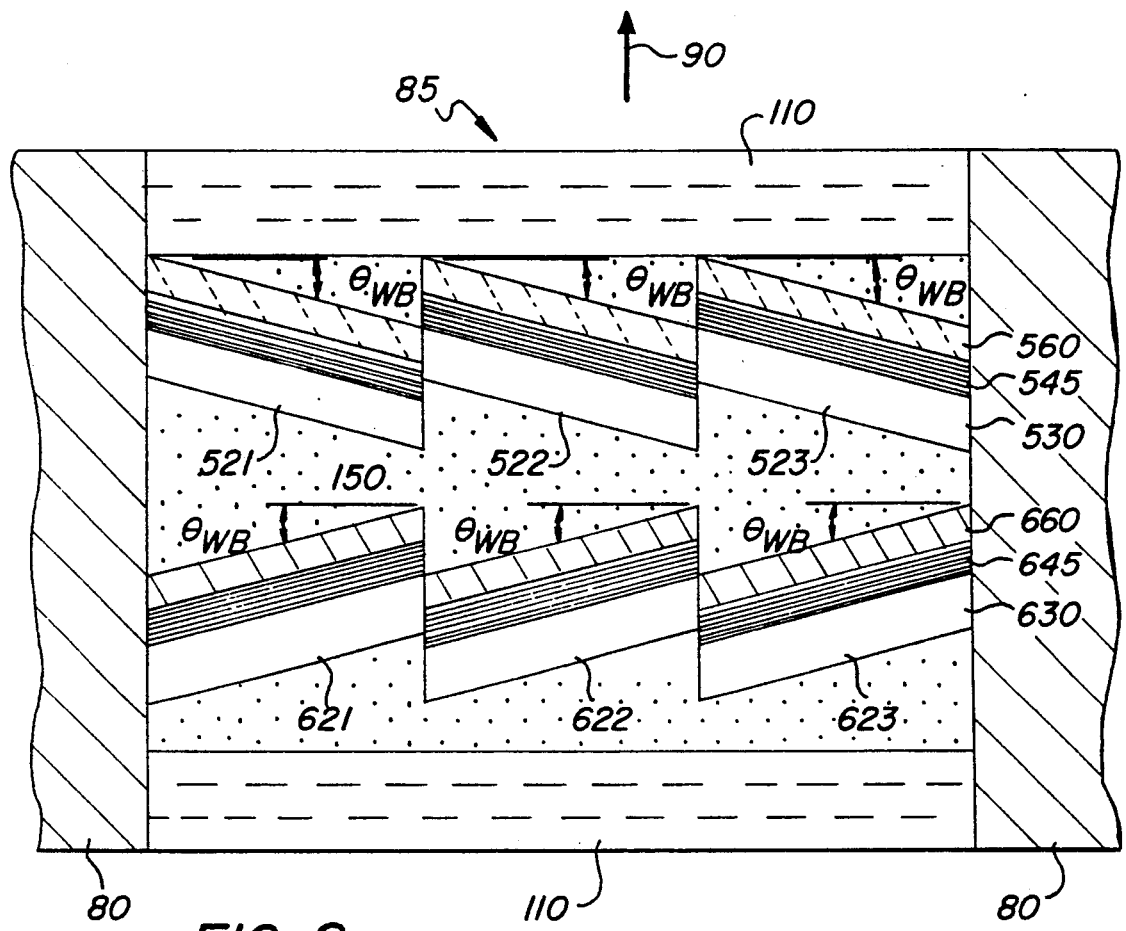
FIG. 8 illustrates a further alternative structure for construction of the laser protection window of the present invention.

FIG. 8 illustrates a further alternative structure for construction of the combined laser protection window. The laser protection window of this embodiment is formed within an opening 85 in a wall 80 and includes first plate 100 and second plate 110 as illustrated in FIG. 6. FIG. 8 illustrates first holographic optical element plate segments 521, 522 and 523 which correspond to the first holographic optical element plate 520 illustrated in FIG. 6. FIG. 8 illustrates second holographic optical element plate segments 621, 522 and 623 which correspond to the second holographic optical element plate 620 illustrated in FIG. 6. FIG. 8 further illustrates transparent filler 105 which fills the space between first holographic optical element plate segments 521, 522 and 523, and second holographic optical element plate segments 621, 622 and 623. The alternative structure illustrated in FIG. 8 is constructed in a manner similar to the construction of the structure illustrated in FIG. 5.

The technique of the present invention can be generalized to any number of holographic optical element plates or equivalent sets of plate segments. It is desirable to provide continuous filtering of the threat wavelength $\lambda_t$ for angles of incidence of $\pm N\ \theta_{wB}$, where N is the number of such holographic optical element plates or equivalent sets of plate segments. In order to provide this filtering the holographic optical element plates or equivalent sets of plate segments are disposed in tandem with varying angles relative to the direction of primary view 90. The difference between the adjacent angles should be selected with regard to the respective blocking angles to provide continuous coverage. Lastly, the angles of the holographic optical element plates or equivalent sets of plate segments should be symmetrical about the direction of primary view 90. This symmetry may include one holographic optical element plate disposed normal to the direction of primary view 90 as illustrated in FIGS. 3 and 5, or may include no such holographic optical element plate as illustrated in FIGS. 6 and 8.

The number of holographic optical elements needed to provide coverage over a particular angular bandwidth is related to the angular bandwidth of a single holographic optical element. The angular bandwidth of a single holographic optical element is related to the amplitude of modulation of the index of refraction $\Delta N$. It has been found that the amplitude of modulation of the index of refraction $\Delta N$ available with dichromated gelatin permits construction of a laser protection window with an angular bandwidth of $\pm 90$ degrees with three holographic optical elements. Therefore no more than three holographic optical elements would be needed if the construction of the preferred embodiment were employed. However, the use of more than three filters would be desirable if each filter had a modulation of the index of refraction $\Delta N$ of lower than that provided by dichromated gelatin.

The previous description of the laser protection window of the present invention provides a broadened angular coverage in only a single plane. The structures illustrated in FIGS. 3, 5, 6 and 8 do not provide broadened angular coverage in the plane perpendicular to the plane of these drawings. This technique is probably adequate for a laser protection window disposed in a ground vehicle where the expected laser threat is from a ground source. In such a case, broadened angular coverage in the ground plane would provide enhanced utility, while broadened angular coverage in the vertical plane would provide little additional protection.

Figure 9:
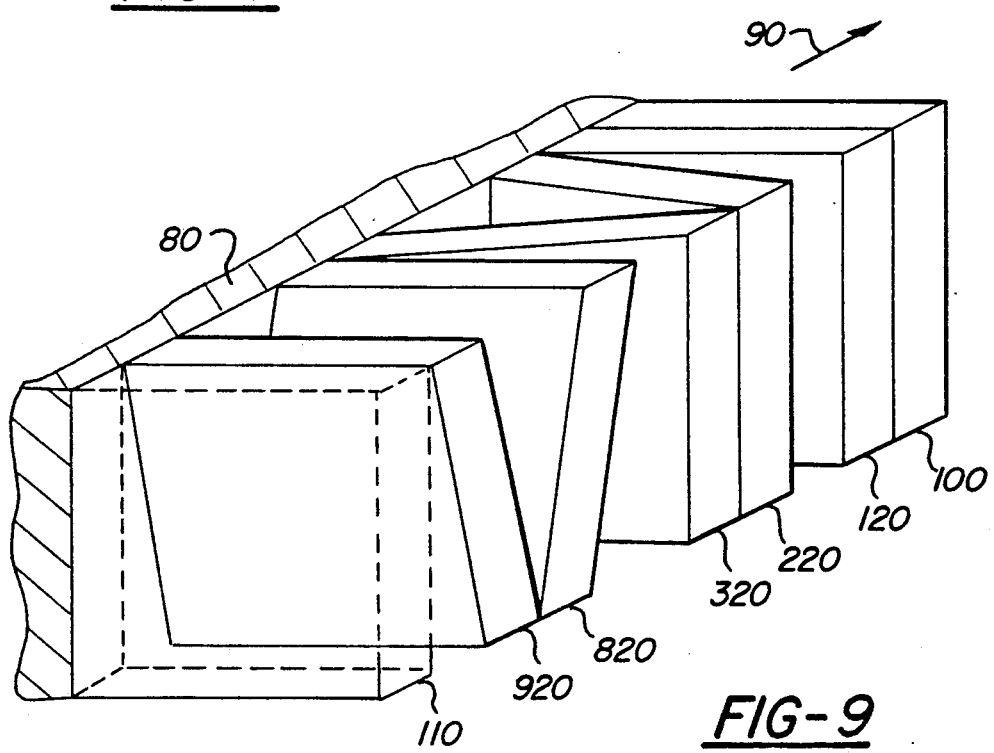
FIG. 9 illustrates in partial cut away from a structure with modulated index of refraction filter element plates with tilts in two planes.

In some applications it may be desirable to provide the broadened angular coverage in both the horizontal and vertical planes. FIG. 9 illustrates in partial cut away form a structure having holographic optical element plates with tilts in two planes. The laser protection window illustrated in FIG. 9 includes first plate 100 and a second plate 110 which are as previously described. The laser protection window includes a first holographic optical element plate 120 which is disposed normal to the direction of primary view 90. Second holographic optical element plate 320 are disposed at respective angles of $\pm 2\ \theta_{wB}$ to the direction of primary view 90 in the horizontal plane. Fourth holographic optical element plate 820 and fifth holographic optical element plate 920 are disposed at respective angles $\pm 2\ \theta_{wB}$ to the direction of primary view 90 in the vertical plane. A transparent filler 105 (not illustrated) should be employed to fill the spaces between the various holographic optical element plates as previously described. Of course any or all of the tilted holographic optical element plates could be constructed from holographic optical element plate segments as illustrated in FIGS. 5 and 8. In addition, holographic optical element plates or holographic optical element plate segments can be tilted in both horizontal and vertical planes, thereby permitting the elimination of some elements. Such a structure would enable the advantages of the present invention in two planes which are mutually perpendicular and which are each perpendicular to the direction of primary view 90.

We claim:

1. A laser protection window comprising:

a first planar modulated index of refraction filter element having a spatially modulated index of refraction therein for reflecting light at a predetermined wavelength which has an angle of incidence to the perpendicular of said first modulated index of refraction filter element of less than a first blocking angle, said first planar modulated index of refraction filter element disposed perpendicular to the direction of primary view through the laser protection window;

a set of a plurality of second planar modulated index of refraction filter element segments, each second planar modulated index of refraction filter element segment having a spatially modulated index of refraction therein for reflecting light at said predetermined wavelength which has an angle of incidence to the perpendicular of said second planar modulated index of refraction filter element segment of less than a second blocking angle, each of said second planar modulated index of refraction filter element segments disposed at a predetermined angle to the direction of primary view through the laser protection window in tandem with a unique portion of said first planar modulated index of refraction filter element; and a set of a plurality of third planar modulated index of refraction filter element segments, each third planar modulated index of refraction filter element segment having a spatially modulated index of refraction therein for reflecting light at said predetermined wavelength which has an angle of incidence to the perpendicular of said third planar modulated index of refraction filter element segment of less than said second blocking angle, each of said third planar modulated index of refraction filter element segments disposed at an angle to the direction of primary view through the laser protection window opposite to said predetermined angle in tandem with a unique portion of said first planar modulated index of refraction filter element.

2. The laser protection window as claimed in claim 1, wherein:

said predetermined angle is approximately the sum of planar said first blocking angle of said first modulated index of refraction filter element and said second blocking angle of said second and third planar modulated index of refraction filter element segments.

3. The laser protection window as claimed in claim 1, wherein:

said first planar modulated index of refraction filter element has a predetermined height and a predetermined width; and said second and third planar modulated index of refraction filter element segments each have a height equal to said predetermined height, the combined width of said second planar modulated index of refraction filter element segments is equal to the product of said predetermined width and the secant of said predetermined angle, and the combined width of said third planar modulated index of refraction filter element segments is equal to the product of said predetermined width and the secant of said predetermined angle.

4. A laser protection window as claimed in claim 1, wherein:
said first planar modulated index of refraction filter element and each of said plurality of said second and third planar modulated index of refraction filter element segments consists of a holographic optical element.

5. A laser protection window as claimed in claim 1, wherein:
said first planar modulated index of refraction filter element and each of said plurality of said second and third planar modulated index of refraction filter element segments consists of a multilayer dielectric filter.

6. A laser protection window comprising:
a set of a plurality of first planar modulated index of refraction filter element segments, each first planar modulated index of refraction filter element segment having a spatially modulated index of refraction therein for reflecting light at said predetermined wavelength which has an angle of incidence to the perpendicular of said first planar modulated index of refraction filter element segment of less than a blocking angle, each of said first planar modulated index of refraction filter element segments disposed at a predetermined angle to the direction of primary view through the laser protection window; and
a set of a plurality of second planar modulated index of refraction filter element segments, each second planar modulated index of refraction filter element segment having a spatially modulated index of refraction therein for reflecting light at said predetermined wavelength which has an angle of incidence to the perpendicular of said second planar modulated index of refraction filter element segment of less than said blocking angle, each of said second planar modulated index of refraction filter element segments disposed at an angle to the direction of primary view through the laser protection window opposite to said predetermined angle, said plurality of second planar modulated index of refraction filter element segments together being disposed in tandem with said plurality of first planar modulated index of refraction filter element segments.

7. The laser protection window as claimed in claim 6, wherein:
said predetermined angle is approximately said blocking angle of one of said plurality of first planar modulated index of refraction filter element segments.

8. A laser protection window as claimed in claim 6, wherein:
each of said plurality of first and second planar modulated index of refraction filter element segments consists of a holographic optical element.

9. A laser protection window as claimed in claim 6, wherein:
each of said plurality of first and second planar modulated index of refraction filter element segments consists of a multilayer dielectric filter.

10. A laser protection window comprising:
a plurality of planar modulated index of refraction filter elements, each having a corresponding depth and a spatially modulated index of refraction therein solely dependent on depth for reflecting light at a predetermined wavelength which has an angle of incidence to the perpendicular of said planar modulated index of refraction filter element of less than a respective blocking angle, said plurality of planar modulated index of refraction filter elements disposed in tandem at corresponding angles to a direction of primary view through the laser protection window, the set of corresponding angles of said plurality of planar modulated index of refraction filter elements being fixed upon manufacture, symmetrical with respect to the direction of primary view through the laser protection window and selected in related to said respective blocking angles, wherein said plurality of planar modulated index of refraction filter elements consists of
a first modulated index of refraction filter element disposed perpendicular to the direction of primary view through the laser protection window,
a second modulated index of refraction filter element disposed at a predetermined angle within a horizontal plane to the direction of primary view through the laser protection window, and
a third modulated index of refraction filter element disposed at an angle within a horizontal plane to the direction of primary view through the laser protection window opposite to said predetermined angle,
whereby light having an angle of incidence to the perpendicular of said laser protection window within an extended continuous angular range is within said blocking angle of at least one of said planar modulated index of refraction filter elements.

11. The laser protection window as claimed in claim 10, wherein:
said second and third modulated index of refraction filter elements are constructed having identical respective blocking angles; and
said predetermined angle is approximately two times said blocking angle of said second and third modulated index of refraction filter elements.

12. The laser protection window as claimed in claim 10, wherein:
said first modulated index of refraction filter element has a predetermined height and a predetermined width; and
said second and third modulated index of refraction filter elements each have a height equal to said predetermined height and a width equal to the product of said predetermined width and the secant of said predetermined angle.

13. A laser protection window comprising:
a plurality of planar modulated index of refraction filter elements, each having a corresponding depth and a spatially modulated index of refraction therein solely dependent on depth for reflecting light at a predetermined wavelength which has an angle of incidence to the perpendicular of said planar modulated index of refraction filter element of less than a respective blocking angle, said plurality of planar modulated index of refraction filter elements disposed in tandem at corresponding angles to a direction of primary view through the laser protection window, the set of corresponding angles of said plurality of planar modulated index of refraction filter elements being fixed upon manufacture, symmetrical with respect to the direction of primary view through the laser protection window and selected in related to said respective blocking angles, wherein said plurality of planar modulated index of refraction filter elements includes at least one first modulated index of refraction filter element disposed at a corresponding first predetermined angle within a horizontal plane to the direction of primary view through the laser protection window, at least one second modulated index of refraction filter element, each second modulated index of refraction filter element corresponding to one of said first modulated index of refraction filter elements, each second modulated index of refraction filter element disposed at an angle within a horizontal plane to the direction of primary view through the laser protection window opposite to said first predetermined angle of said corresponding first modulated index of refraction filter element, at least one third modulated index of refraction filter element disposed at a corresponding second predetermined angle within a vertical plane to the direction of primary view through the laser protection window, and at least one fourth modulated index of refraction filter element, each fourth modulated index of refraction filter element corresponding to one of said third modulated index of refraction filter elements, each fourth modulated index of refraction filter element disposed at an angle within a vertical plane to the direction of primary view through the laser protection window opposite to said third predetermined angle of said corresponding third modulated index of refraction filter element, whereby light having an angle of incidence to the perpendicular of said laser protection window within an extended continuous angular range is within said blocking angle of at least one of said planar modulated index of refraction filter elements.

14. A laser protection window comprising:
a plurality of planar modulated index of refraction filter elements, each having a corresponding depth and a spatially modulated index of refraction therein solely dependent on depth for reflecting light at a predetermined wavelength which has an angle of incidence to the perpendicular of said planar modulated index of refraction filter element of less than a respective blocking angle, said plurality of planar modulated index of refraction filter elements disposed in tandem at corresponding angles to a direction of primary view through the laser protection window, the set of corresponding angles of said plurality of planar modulated index of refraction filter elements being fixed upon manufacture, symmetrical with respect to the direction of primary view through the laser protection window and selected in relation to said respective blocking angles whereby light having an angle of incidence to the perpendicular of said laser protection within an extended continuous angular range is within said blocking angle of at least one of said planar modulated index of refraction filter elements;

a first transparent plate disposed at an exterior end of the tandem arrangement of said plurality of modulated index of refraction filter elements, said first plate formed of a shatter proof material; and a second transparent plate disposed at an interior end of the tandem arrangement of said plurality of modulated index of refraction filter elements, said second plate formed of a shatter proof material.

15. A laser protection window as claimed in claim 14, further comprising:
a transparent filler disposed to fill the space between said first transparent plate, said plurality of modulated index of refraction filter elements and said second transparent plate.

16. A laser protection window comprising:
a plurality of planar modulated index of refraction filter elements, each of said plurality of planar modulated index of refraction filter elements consisting of a holographic optical element having a corresponding depth and a spatially modulated index of refraction therein solely dependent on depth for reflecting light at a predetermined wavelength which has an angle of incidence to the perpendicular of said planar modulated index of refraction filter element of less than a respective blocking angle, said plurality of planar modulated index of refraction filter elements disposed in tandem at corresponding angles to a direction of primary view through the laser protection window, the set of corresponding angles of said plurality of planar modulated index of refraction filter elements being fixed upon manufacture, symmetrical with respect to the direction of primary view through the laser protection window and selected in relation to said respective blocking angles whereby light having an angle of incidence to the perpendicular of said laser protection window within an extended continuous angular range is within said blocking angle of at least one of said planar modulated index of refraction filter elements.

17. A method of construction of a laser protection window comprising the steps of:
constructing first, second, and third substantially identical planar modulated index of refraction filter elements, each planar modulated index of refraction filter element having a corresponding depth and a spatially modulated index of refraction therein solely dependent on depth for reflecting light at a predetermined wavelength which has an angle to the perpendicular of said planar modulated index of refraction filter element of less than a respective blocking angle; and disposing said planar modulated index of refraction filter elements in tandem at corresponding angles to a direction of primary view through the laser protection window such that said first modulated index of refraction filter element is disposed perpendicular to the direction of primary view through the laser protection window, said second modulated index of refraction filter element is disposed in tandem with said first modulated index of refraction filter element at a predetermined angle to the direction of primary view through the laser protection window, and said third modulated index of refraction filter element is disposed in tandem with said first and second modulated index of refraction filter elements at an angle to said direction of primary view through the laser protection window opposite to said predetermined angle, the set of corresponding angles of said plurality of planar modulated index of refraction filter elements being fixed and manufactured, symmetrical with respect to the direction of primary view through the laser protection window and selected in relation to said respective blocking angles, whereby light having an angle of incidence to the perpendicular of said laser protection window within an extended continuous angular range is within said blocking angle of at least one of said planar modulated index of refraction filter elements.

18. The method for construction of a laser protection window as claimed in claim 17, wherein:

said step of constructing said plurality of planar modulated index of refraction filter elements includes construction of said first modulated index of refraction filter element having a predetermined height and a predetermined width and construction of said second and third modulated index of refraction filter elements having a height equal to said predetermined height and a width equal to the product of said predetermined width and the secant of said predetermined angle.

19. The method for construction of a laser protection window as claimed in claim 18, wherein:

said step of disposing said plurality of planar modulated index of refraction filter elements in tandem at corresponding angles to a direction of primary view through the laser protection window includes:

separating said second modulated index of refraction filter element along vertical lines into a plurality of second modulated index of refraction filter element segments, and disposing each second modulated index of refraction filter element segment in tandem with a unique portion of said first modulated index of refraction filter element at said predetermined angle to the direction of primary view through the laser protection window, said second modulated index of refraction filter element segments together being in tandem with all parts of said first modulated index of refraction filter element;

separating said third modulated index of refraction filter element along vertical lines into a plurality of third modulated index of refraction filter element segments, and disposing each third modulated index of refraction filter element segment in tandem with a unique portion of said first modulated index of refraction filter element at said angle opposite to said predetermined angle to the direction of primary view through the laser protection window, said third modulated index of refraction filter element segments together being in tandem with all parts of said first modulated index of refraction filter element.

20. A method of construction of a laser protection window comprising the steps of:

constructing a first modulated index of refraction filter element, a second modulated index of refraction filter element, a third modulated index of refraction filter element and a fourth modulated index of refraction filter element, each of said plurality of substantially identical planar modulated index of refraction filter elements having a corresponding depth and a spatially modulated index of refraction therein solely dependent on depth for reflecting light at a predetermined wavelength which has an angle to the perpendicular of said planar modulated index of refraction filter element of less than a respective blocking angle; and disposing said planar modulated index of refraction filter elements in tandem at corresponding angles to a direction of primary view through the laser protection window by disposing said first modulated index of refraction filter element at a first predetermined angle within a horizontal plane to the direction of primary view through the laser protection window, disposing said second modulated index of refraction filter element at an angle within a horizontal plane to the direction of primary view through the laser protection window opposite to said first predetermined angle of said first modulated index of refraction filter element, disposing said third modulated index of refraction filter element at a second predetermined angle within a vertical plane to the direction of primary view through the laser protection window, and disposing said fourth modulated index of refraction filter element at an angle within a vertical plane to the direction of primary view through the laser protection window opposite to said second predetermined angle of said third modulated index of refraction filter element.

21. A method of construction of a laser protection window comprising the steps of:

constructing a plurality of substantially identical planar modulated index of refraction filter elements, each planar modulated index of refraction filter element having a corresponding depth and a spatially modulated index of refraction therein solely dependent on depth for reflecting light at a predetermined wavelength which has an angle to the perpendicular of said planar modulated index of refraction filter element of less than a respective blocking angle;

disposing said plurality of planar modulated index of refraction filter elements in tandem at corresponding angles to a direction of primary view through the laser protection window, the set of corresponding angles of said plurality of planar modulated index of refraction filter elements being fixed and manufactured, symmetrical with respect to the direction of primary view through the laser protection window and selected in relation to said respective blocking angles;

disposing a first transparent plate formed of shatter proof material at an exterior end of the tandem arrangement of said plurality of modulated index of refraction filter elements; and disposing a second transparent plate formed of a shatter proof material at an interior end of the tandem arrangement of said plurality of modulated index of refraction filter elements, whereby light having an angle of incidence to the perpendicular of said laser protection window within an extended continuous angular range is within said blocking angle of at least one of said planar modulated index of refraction filter elements.

22. The method of construction of a laser protection window as claimed in claim 21, further comprising the step of:
disposing a transparent filler having an index of refraction near the index of refraction of said plurality of modulated index of refraction filter elements to fill the space between said first transparent plate, said plurality of modulated index of refraction filter elements and said second transparent plate.

23. A method of construction of a laser protection window comprising the steps of:
constructing a plurality of substantially identical planar modulated index of refraction filter elements, each planar modulated index of refraction filter element having a corresponding depth and a spatially modulated index of refraction therein solely dependent on depth for reflecting light at a predetermined wavelength which has an angle to the perpendicular of said planar modulated index of refraction filter element of less than a respective blocking angle;
said step of constructing each of said plurality of substantially identical modulated index of refraction filter elements including
disposing a layer of photosensitive material on one surface of a transparent supporting substrate thereby forming a photosensitive layer having an open surface,
disposing a reflecting surface on said open surface of said photosensitive layer,
exposing said photosensitive layer to coherent light illumination via said transparent supporting substrate thereby forming interference fringes therein from light directly incident upon said photosensitive layer and light reflected from said reflecting surface,
removing said reflecting surface from said open surface of said photosensitive layer after said exposure, and
developing said exposed photosensitive layer thereby forming a modulated index of refraction filter element having interference fringes corresponding to the interference fringes of said exposure; and
disposing said plurality of planar modulated index of refraction filter elements in tandem at corresponding angles to a direction of primary view through the laser protection window, the set of corresponding angles of said plurality of planar modulated index of refraction filter elements being fixed and manufactured, symmetrical with respect to the direction of primary view through the laser protection window and selected in relation to said respective blocking angles;
whereby light having an angle of incidence to the perpendicular of said laser protection window within an extended continuous angular range is within said blocking angle of at least one of said planar modulated index of refraction filter elements.

24. The method for construction of a laser protection window as claimed in claim 23, wherein:
said step of exposing said photosensitive layer to coherent light illumination includes:
generating a first beam of light having a high degree of coherence,
reducing the coherence of said first beam of light thereby producing a second beam of light having a reduced coherence length,
illuminating said photosensitive layer via said transparent supporting substrate,
reflecting said second beam of light from said reflecting surface thereby forming a third beam of light,
whereby said reduced coherence length is greater than the path length of said third beam of light from said reflecting surface to said transparent supporting substrate and less than the path length of said third beam of light from said reflecting surface to the surface of said transparent supporting substrate opposite said photosensitive layer and reflected back to said photosensitive layer, thereby preventing the formation of interference fringes from such reflections.

25. The method for construction of a laser protection window as claimed in claim 24, wherein:
said step of reducing the coherence of said first beam of light includes passing said first beam of light through a moving diffuser plate thereby forming an extended light source having differing phases at differing locations.

* * * * *

UNITED STATES PATENT AND TRADEMARK OFFICE
CERTIFICATE OF CORRECTION

PATENT NO. : 5,179,630  
DATED : January 12, 1993  
INVENTOR(S) : B.J. Chang, Et. Al.

It is certified that error appears in the above-indentified patent and that said Letters Patent is hereby corrected as shown below:

Column 1, Line 8, Delete "production" Insert --protection--

Column 1, Line 49, Delete "production" Insert --protection--

Column 2, Line 15, Delete "position" Insert --construction geometrics related to the expected position--

Column 2, Line 42, Insert after "laser protection" --window, contrary to the case of laser eye protection--

Column 2, Line 57, Delete "use" Insert --user--

Column 3, Line 14, Delete "The" Insert --This--

Column 4, Line 8, Delete "elements" Insert --element--

Column 4, Line 60, Delete "layer" Insert --laser--

Column 4, Line 66, Delete "from" Insert --form--

Column 5, Line 44, Delete "40" Insert --50--

Column 5, Line 63, Insert after "collimating lens 26"/.--Thus light rays 13 emerge from collimating lens 26--

Column 6, Line 17, Delete "will follow" Insert --will now follow--

Column 7, Line 18, after "interference" Insert --of the further reflected rays 17 with the illumination--

UNITED STATES PATENT AND TRADEMARK OFFICE
CERTIFICATE OF CORRECTION

PATENT NO. : 5,179,630

DATED : January 12, 1993

INVENTOR(S) : B.J. Chang, Et. Al.

It is certified that error appears in the above-identified patent and that said Letters Patent is hereby corrected as shown below:

Column 7, Line 64, Delete "substrate" Insert --substrate 30--

Column 10, Line 14, Delete "200" Insert --220--

Column 10, Line 30, Delete "100" Insert --110--

Column 14, Line 45, Delete "+2" Insert --$\pm 2$--

Column 14, Line 56, Delete "522" Insert --622--

Column 15, Line 61, Delete "angles" Insert --angles of--

Column 16, Line 53, 54, Delete "sum of planar said"
                               Insert --sum of said--

Column 16, Line 54-55, Delete "said first modulated"
                               Insert --said first planar modulated--

Column 18, Line 18, Delete "related" Insert --relation--

Column 19, Line 7, Delete "related" Insert --relation--

UNITED STATES PATENT AND TRADEMARK OFFICE
CERTIFICATE OF CORRECTION

PATENT NO. : 5,179,630
DATED : January 12, 1993
INVENTOR(S) : B.J. Chang, Et. Al.

It is certified that error appears in the above-indentified patent and that said Letters Patent is hereby corrected as shown below:

Column 24, Line 10, Delete "angles;" Insert --angles,--

Signed and Sealed this

Fifteenth Day of February, 1994

*Attest:*

BRUCE LEHMAN

*Attesting Officer*     Commissioner of Patents and Trademarks